A. G. RAJA.
WHEEL.
APPLICATION FILED AUG. 12, 1920.
1,405,329.
Patented Jan. 31, 1922.
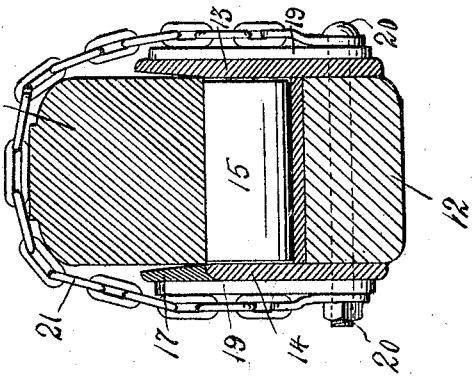
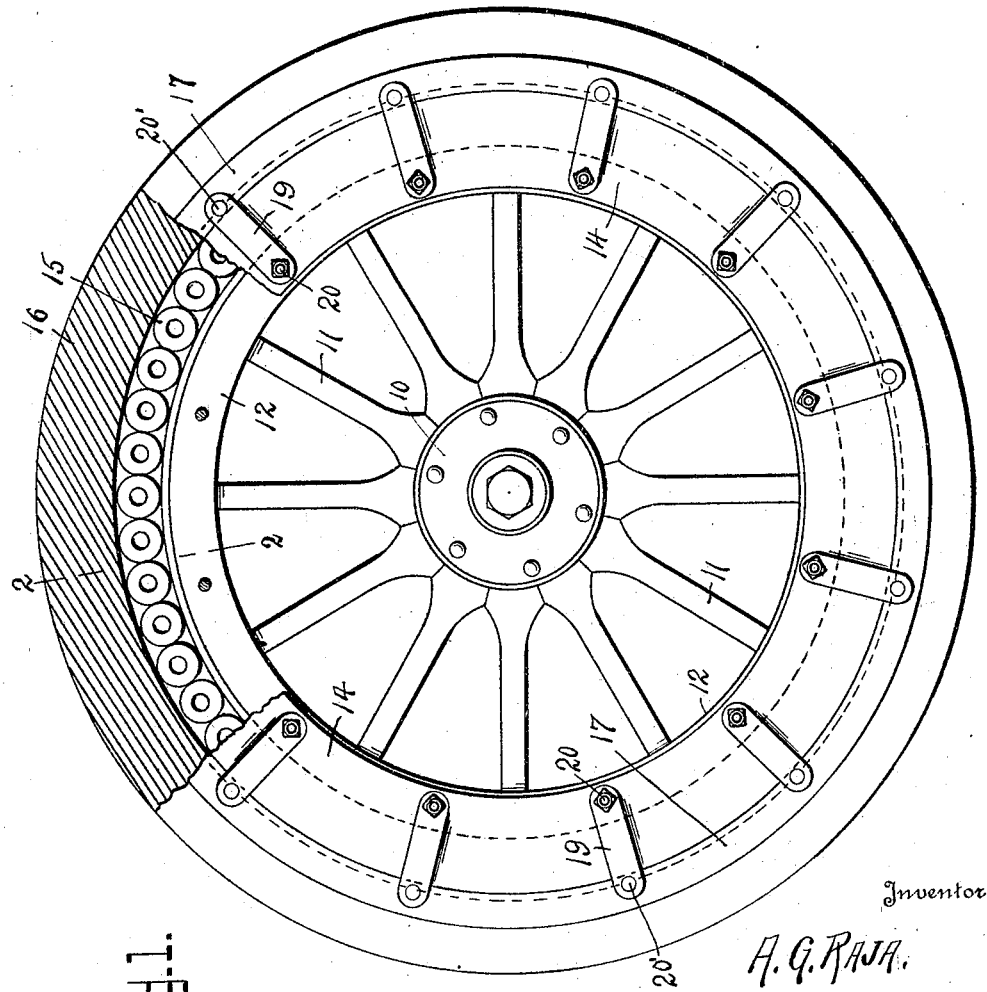
Inventor
A. G. Raja.
By Geo. P. Kimmel
Attorney

UNITED STATES PATENT OFFICE.

ANGELO G. RAJA, OF CHICAGO, ILLINOIS.

WHEEL.

1,405,329.　　　Specification of Letters Patent.　　Patented Jan. 31, 1922.

Application filed August 12, 1920. Serial No. 403,042.

*To all whom it may concern:*

Be it known that I, ANGELO G. RAJA, a citizen of the United States, residing at Chicago, in the county of Cook and State of Illinois, have invented certain new and useful Improvements in a Wheel, of which the following is a specification.

This invention relates to vehicle wheels designed for use more particularly upon automobiles, auto trucks, bicycles and the like, and has for one of its objects to produce a tire construction for wheels of this class of improved efficiency and durability and which is non-puncturable and at the same time light and resilient.

With these and other objects in view, the invention consists in certain novel features of construction as hereinafter shown and described and then specifically pointed out in the claim, and in the drawings illustrative of the preferred embodiment of the invention.

Figure 1 is a side view, partly in section, of a vehicle wheel having its rim and tire constructed in accordance with the invention, Fig. 2 is an enlarged transverse section on the line 2—2 of Fig. 1.

The improved tire structure may be adapted without material structural change to wheels of various forms, but for the purpose of illustration is shown applied to a conventional wheel of the usual construction, and including a hub 10, spokes 11 and felloe 12. Bearing upon one side face of the felloe 12 is an annular relatively wide holding plate 13, and bearing against the other side face of the felloe is another narrow annular holding plate 14.

Fitting in the space between the plates 13 and 14 and against the felloe 12 are a plurality of rollers 15 of yieldable material, such as relatively soft rubber, or the like, of the quality usually employed upon vehicle wheels.

A detachable annular holding plate 17 is arranged to bear upon the outer edge of the narrow plate 14 and against the tire member 16, as shown more clearly in Fig. 2.

Holding clips 19 bear at intervals against the annular plate 13 at one side and against the plates 14 and 17 at the other side. The inner ends of the clips are connected to the plates 13 and 14 and to the felloe 12 by the bolts 20, and the clips 19 at one side are connected at their outer ends by rivets, bolts, or like devices, indicated at 20', to the member 17.

The bolts 20 may be utilized to support anti-skidding chains 21, as shown.

By this simple arrangement a very efficient wheel tire is produced which possesses all the advantages of the usual pneumatic tire without danger of puncture.

The parts are easily separable for renewal or repairs.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:

In a wheel including a felloe member, a relatively wide and a relatively narrow annular holding plate attached to the felloe at opposite sides and extending beyond the same, tire supporting elements disposed between the holding plates and prevented from lateral displacement thereby, the outer faces of the supporting elements being substantially flush with the outer margin of the narrower annular plate, a tire engaging over the tire supporting elements and against the wider annular plate, an annular tire retaining member bearing upon the edge of the narrower annular plate, a plurality of clip devices bearing over the narrower annular plate and the annular tire retaining member, fastening devices attaching the clip devices to the narrow annular plate and to the felloe, and fastening devices attaching the clip devices to the annular tire retaining member.

In testimony whereof, I affix my signature hereto.

ANGELO G. RAJA.